(12) United States Patent
Li

(10) Patent No.: US 12,182,580 B2
(45) Date of Patent: Dec. 31, 2024

(54) PERIPHERAL COMPONENT INTERCONNECT EXPRESS DEVICE STARTUP METHOD AND APPARATUS, AND STORAGE MEDIUM

(71) Applicant: HUAWEI TECHNOLOGIES CO., LTD., Guangdong (CN)

(72) Inventor: Yutao Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 69 days.

(21) Appl. No.: 18/170,574

(22) Filed: Feb. 17, 2023

(65) Prior Publication Data

US 2023/0195473 A1 Jun. 22, 2023

Related U.S. Application Data

(63) Continuation of application No. PCT/CN2021/106710, filed on Jul. 16, 2021.

(30) Foreign Application Priority Data

Aug. 21, 2020 (CN) .......................... 202010849505.0

(51) Int. Cl.
  *G06F 9/4401* (2018.01)
  *G06F 13/42* (2006.01)
  *G06F 21/85* (2013.01)

(52) U.S. Cl.
  CPC ........ *G06F 9/4403* (2013.01); *G06F 13/4221* (2013.01); *G06F 21/85* (2013.01); *G06F 2213/0026* (2013.01)

(58) Field of Classification Search
  CPC .... G06F 9/4403; G06F 13/4221; G06F 21/85; G06F 2213/0026; G06F 9/4411; G06F 9/44589; G06F 21/572; G06F 21/575; G06F 21/64; G06F 21/71
  See application file for complete search history.

(56) References Cited

U.S. PATENT DOCUMENTS 9,262,637 B2 * 2/2016 Jacobs .................... G06F 21/57
9,336,395 B2    5/2016 Berlin
9,639,700 B2    5/2017 Campbell et al.
(Continued)

FOREIGN PATENT DOCUMENTS

CN      101199159 A    6/2008
CN      107451479 A   12/2017
(Continued)

OTHER PUBLICATIONS

International Search Report and Written Opinion issued PCT/CN2021/106710 dated Oct. 15, 2021, 11 pages.

*Primary Examiner* — Faisal M Zaman

(57) ABSTRACT

A method, apparatus and storage medium for starting up peripheral component interconnect express (PCIE) device are provided. According to the method, a basic input/output system (BIOS) attempts to verify firmware of a PCIE device to determine whether the firmware of the PCIE device is tampered with. Moreover, the BIOS may only start up a PCIE device with firmware that succeeds in the verification. Therefore, a computer device is prevented from starting up a PCIE device with firmware that is tampered with, thereby reducing the security risk caused by the PCIE device to the computer device.

18 Claims, 9 Drawing Sheets

(56) References Cited

U.S. PATENT DOCUMENTS

| | | | | |
|---|---|---|---|---|
| 9,672,362 | B2* | 6/2017 | Butcher | G06F 21/575 |
| 10,776,286 | B1* | 9/2020 | Kulchytskyy | G06F 8/65 |
| 2014/0365755 | A1* | 12/2014 | Liu | G06F 21/572 |
| | | | | 713/2 |
| 2015/0113263 | A1* | 4/2015 | Wu | G06F 8/654 |
| | | | | 713/100 |
| 2017/0090948 | A1* | 3/2017 | Waidhofer | G06F 8/654 |
| 2017/0109531 | A1 | 4/2017 | Wang et al. | |
| 2019/0052617 | A1* | 2/2019 | Chen | H04L 9/3234 |
| 2019/0188387 | A1* | 6/2019 | Fu | H04L 9/0894 |
| 2019/0318097 | A1* | 10/2019 | Katragada | G06F 21/72 |
| 2020/0097658 | A1* | 3/2020 | Samuel | G06F 11/0793 |
| 2021/0240831 | A1* | 8/2021 | Oncale | G06F 8/65 |
| 2021/0303691 | A1* | 9/2021 | Dewan | G06F 21/572 |

FOREIGN PATENT DOCUMENTS

| | | |
|---|---|---|
| CN | 110321715 A | 10/2019 |
| CN | 110334521 A | 10/2019 |
| CN | 111008379 A | 4/2020 |

\* cited by examiner

PERIPHERAL COMPONENT INTERCONNECT EXPRESS DEVICE STARTUP METHOD AND APPARATUS, AND STORAGE MEDIUM

CROSS-REFERENCE TO RELATED APPLICATIONS

This application is a continuation of International Application No. PCT/CN2021/106710, filed on Jul. 16, 2021, which claims priority to Chinese Patent Application No. 202010849505.0, filed on Aug. 21, 2020. The disclosures of the aforementioned applications are hereby incorporated by reference in their entireties.

TECHNICAL FIELD

The present disclosure relates to the field of computer technologies, and in particular, to a peripheral component interconnect express device startup method and apparatus, and a storage medium.

BACKGROUND

With the development of network technologies, a computer device has an increasingly strict requirement on network security. To ensure network security of the computer device, in a system initialization process, a trusted platform module (TPM) chip in the computer device attempts to verify some components in the computer device, and the computer device starts up a verified component.

Given an example of a computer device starting up a basic input/output system, at present, a process in which the computer device starts up the BIOS is: in the system initialization process, the TPM chip reads firmware of the BIOS, and performs integrity verification on the read firmware. If the verification for the read firmware succeeds, the firmware is not tampered with, and the computer device starts up the BIOS. If the verification for the read firmware fails, the firmware may have been tampered with, and the computer device does not start up the BIOS. In this way, a BIOS that has been tampered with is prevented from being started up.

However, the TPM chip may perform integrity verification only on some components such as the BIOS and a baseboard management controller (BMC) in the computer device, but does not perform the integrity verification on a peripheral component interconnect express (PCIE) device mounted to the computer device. In this case, a PCIE device started up by the computer device is not necessarily secure. For example, malicious code may have been implanted in the PCIE device. Subsequently, when an operating system in the computer device communicates with the PCIE device into which the malicious code is implanted, the operating system may be attacked by the malicious code, thereby threatening security of the computer device. Therefore, to prevent a PCIE device from threatening the security of a computer device, a method for securely starting up a PCIE device is urgently needed.

SUMMARY

Embodiments of the present disclosure provide a peripheral component interconnect express device startup method and apparatus, and a storage medium, so that a PCIE device can be prevented from threatening security of a computer device. The technical solution is as follows:

According to a first aspect, a peripheral component interconnect express (PCIE) device startup method is provided, where the method includes:
an input/output system (BIOS) of the computer device obtains firmware of the PCIE device; the BIOS attempts to verify the firmware; and if the verification for the firmware succeeds, the BIOS starts up the PCIE device.

In the method, the BIOS attempts to verify the firmware of the PCIE device, to determine whether the firmware of the PCIE device is tampered with. The BIOS may start only a PCIE device where the firmware that succeeds in the verification is located. In this way, a computer device is prevented from starting up a PCIE device of which firmware is tampered with, and a security risk caused by the PCIE device to the computer device is reduced.

In a possible implementation, the method further includes:
if the verification for the firmware fails, the BIOS skips starting up the PCIE device.

Based on the foregoing possible implementation, the PCIE device of which the firmware fails to be verified is not started up, so that the computer device is prevented from starting up a PCIE device of which firmware is tampered with. In this way, a security risk caused by the PCIE device to the computer device is reduced.

In a possible implementation, that the BIOS skips starting up the PCIE device includes:
the BIOS controls the PCIE device to be in a reset state or a power-off state; or
the BIOS marks the PCIE device as a startup disabled state, where the startup disabled state is used to indicate to skip starting up the PCIE device.

Based on the foregoing possible implementation, the BIOS controls the PCIE device of which the firmware fails to be verified to be in a reset state or a power-off state, or marks a PCIE device where the firmware failing to be verified is located as a startup disabled state, so that the PCIE device of which the firmware fails to be verified is completely blocked.

In a possible implementation, that an input/output system (BIOS) of the computer device obtains firmware of the PCIE device includes:
the BIOS reads an image of the firmware from an expansion read-only memory (ROM) of the PCIE device.

In a possible implementation, the firmware includes signature data. Before the BIOS obtains the image of the firmware from the expansion read-only memory (ROM) of the PCIE device, the method further includes:
the BIOS reads an image type of the image from the expansion ROM and a certificate type of the signature data, where the image type is used to indicate a code type of the image, and the certificate type is used to indicate an encryption algorithm for calculating the signature data.

In a possible implementation, the firmware includes firmware code and signature data of the firmware code.

That an input/output system (BIOS) of the computer device obtains firmware of the PCIE device includes:
the BIOS obtains the signature data of the firmware code from a driver of the PCIE device; and the BIOS reads the firmware code from the PCIE device.

In a possible implementation, that the BIOS reads the firmware code from the PCIE device includes:
the BIOS reads an image of the firmware code from an expansion ROM of the PCIE device.

In a possible implementation, before the BIOS reads the image of the firmware code from the expansion ROM of the PCIE device, the method further includes:

the BIOS reads an image type of the image from the expansion ROM and a certificate type of the signature data, where the image type is used to indicate a code type of the image, and the certificate type is used to indicate an encryption algorithm for calculating the signature data.

In a possible implementation, that the BIOS obtains the signature data of the firmware code from a driver of the PCIE device includes:

the BIOS reads an image of the driver from an expansion ROM of the PCIE device; and the BIOS obtains the signature data of the firmware code from the image of the driver.

In a possible implementation, before the BIOS attempts to verify the firmware, the method further includes:

the BIOS attempts to verify the driver; and if the verification for the driver succeeds, the BIOS performs the step of reading the firmware code from the PCIE device.

In a possible implementation, the BIOS stores a public key of the PCIE device, and the public key is used to attempt to verify the firmware.

In a possible implementation, the method further includes:

the BIOS modifies the stored public key of the PCIE device based on a public key modification instruction.

According to a second aspect, a PCIE device startup apparatus is provided, and is configured to execute the foregoing PCIE device startup method. Specifically, the PCIE device startup apparatus includes a function module configured to perform the PCIE device startup method provided in any one of the first aspect or the optional implementations of the first aspect.

According to a third aspect, a computer readable storage medium is provided. The storage medium stores at least one piece of program code, and the program code is loaded and executed by a processor to implement operations performed in the PCIE device startup method.

According to a fourth aspect, a computer program product or a computer program is provided. The computer program product or computer program includes computer instructions. The computer instructions are stored in a computer readable storage medium. A processor of a computer device reads the computer instructions from the computer readable storage medium. The processor executes the computer instructions, so that the computer device performs the method provided in the first aspect or the optional implementations of the first aspect.

According to a fifth aspect, a computer device is provided. The computer device includes a processor and a memory. The memory stores at least one piece of program code. The program code is loaded by the processor, so that the computer device implements the method provided in any one of the first aspect or the optional implementations in the first aspect.

BRIEF DESCRIPTION OF DRAWINGS

To describe the technical solutions in embodiments of the present disclosure more clearly, the following briefly describes the accompanying drawings for embodiments. It is clear that the accompanying drawings in the following description show merely some embodiments of the present disclosure, and a person of ordinary skill in the art may still derive other drawings from these accompanying drawings without creative efforts.

DESCRIPTION OF EMBODIMENTS

To make objectives, technical solutions, and advantages of the present disclosure clearer, the following further describes implementations of the present disclosure in detail with reference to the accompanying drawings.

Figure 1:
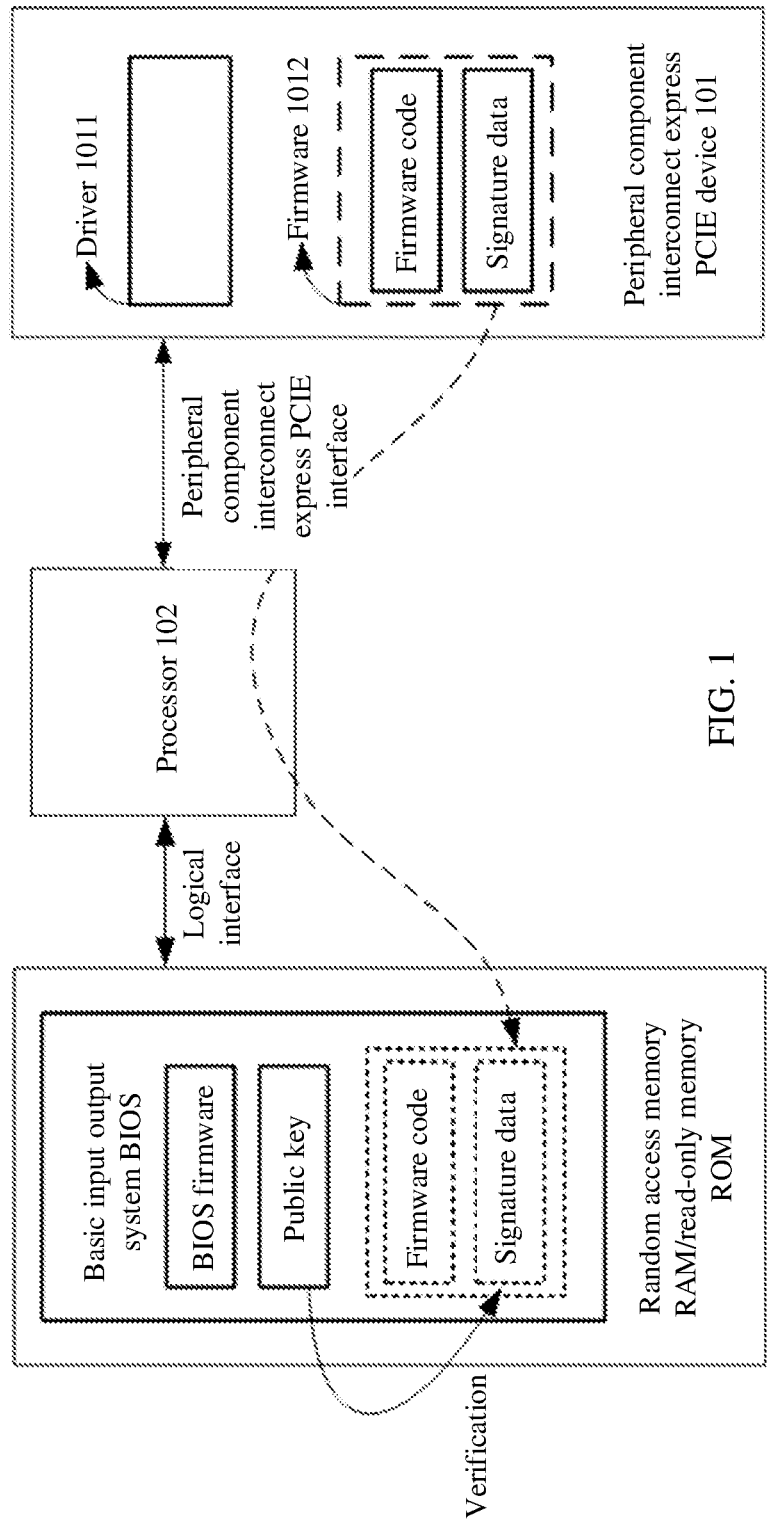
FIG. 1 is a schematic diagram of a structure of a computer device according to an embodiment of the present disclosure.

FIG. 1 is a schematic diagram of a structure of a computer device according to an embodiment of the present disclosure. As shown in FIG. 1, the computer device 100 includes a plurality of peripheral component interconnect express (PCIE) devices 101. The PCIE devices 101 each include a network interface card, a disk array (redundant arrays of independent disks, RAID) card, a graphics card, a peripheral component interconnect express (PCIe) solid state drive (SSD) card, an accelerator card, and the like. The PCIE device 101 is not specifically limited in this embodiment of the present disclosure.

Each PCIE device 101 includes a driver 1011 and firmware 1012, where the driver 1011 is a driver program of the PCIE device and can be invoked by a BIOS running in the computer device 100, so as to implement data exchange between the BIOS and the PCIE device. In an initialization phase, the driver 1011 is further configured to configure a parameter for the PCIE device. Optionally, the driver 1011 is a unified extensible firmware interface (UEFI) driver. The firmware 1012 is configured to implement a function of the PCIE device 101. For example, target firmware of the network interface card is configured to implement functions such as network connection, packet forwarding, and protocol offloading of the network interface card. Optionally, the firmware 1012 includes firmware code and signature data of the firmware code. The firmware code is code used to implement the function of the PCIE device 101. The signature data is a digital signature of the firmware code and is used to determine whether the firmware code is tampered with, that is, the signature data is used to ensure integrity of the firmware code. In another possible implementation, the firmware 1012 does not include signature data of the firmware code, and the signature data of the firmware code is stored in the driver 1011. In this case, the firmware code may be considered as the firmware 1012.

The BIOS runs on the computer device 100. The BIOS is configured to obtain the firmware 1012 of the PCIE device 101, and attempt to verify the obtained firmware 1012. If the verification for the firmware 1012 succeeds, the BIOS starts up the PCIE device 101 where the firmware 1012 is located;

otherwise, the BIOS skips starting up the PCIE device 101 where the firmware 1012 is located. A manner in which the BIOS obtains the firmware 1012 of the PCIE device 101 includes a manner 1 and a manner 2. The manner 1 is: the BIOS reads, from the PCIE device 101, the firmware 1012 including the signature data and the firmware code. The manner 2 is: the BIOS reads the driver 1011 from the PCIE device 101, obtains the signature data of the firmware code from the read driver 1011, and reads the firmware code from the PCIE device.

Optionally, the BIOS stores public keys of the plurality of PCIE devices 101. Each public key corresponds to a target identifier of a PCIE device, and a public key is used to attempt to verify firmware of a PCIE device indicated by a corresponding target identifier. One target identifier is used to indicate one PCIE device. The target identifier is a device identifier of the PCIE device, or a slot identifier of a slot where the PCIE device is located. Optionally, when the BIOS receives a public key modification instruction, the BIOS modifies the stored public key of the PCIE device based on the public key modification instruction. The public key modification instruction includes at least one target public key and a target identifier corresponding to each target public key. For any target identifier corresponding to any target public key in the at least one target public key, the BIOS modifies the stored public key corresponding to the target identifier to the target public key. Optionally, the BIOS further stores BIOS firmware, and the BIOS firmware is code used to implement a BIOS function. Optionally, the BIOS is a UEFI BIOS.

The computer device 100 further includes a processor 102. The BIOS may run on a random access memory (RAM) or a read-only memory (ROM) of the processor 102. The processor 102 is connected to the PCIE device 101 through a target communication interface, so that the BIOS can perform signaling interaction with the PCIE device through the target communication interface. The target communication interface is a PCIE interface. The processor 102 includes a central processing unit (CPU), a graphics processing unit (GPU), an artificial intelligence (AI) processor, and the like. The processor 102 is not specifically limited in this embodiment.

It should be noted that, in some embodiments, a driver and firmware in a PCIE device are separated, that is, the driver and firmware of the PCIE device are two separate parts, such as the PCIE device 101 shown in FIG. 1. However, in some other embodiments, a driver of a PCIE device is located in firmware, that is, the firmware includes the driver, firmware code, and signature data of the firmware code.

Figure 2:
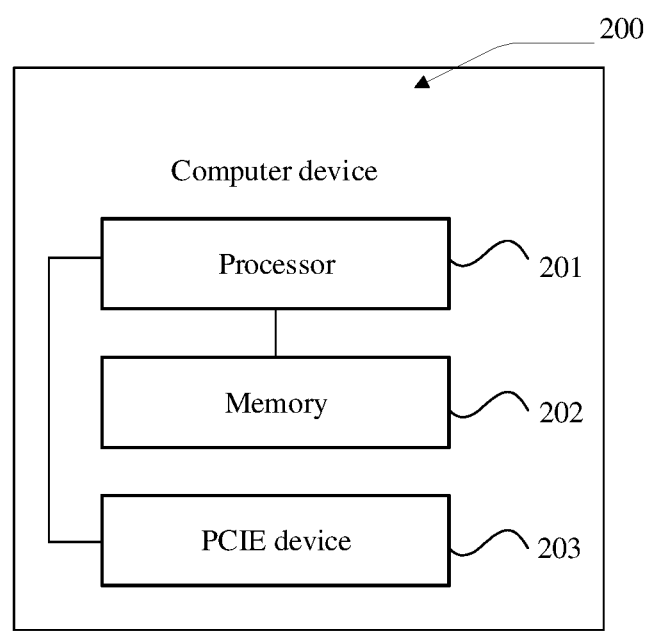
FIG. 2 is a schematic diagram of a structure of a computer device according to an embodiment of the present disclosure.

FIG. 2 is a schematic diagram of a structure of a computer device according to an embodiment of the present disclosure. A computer device 200 may differ greatly due to different configurations or performance, and includes one or more processors 201 and one or more memories 202. The computer device 200 further includes one or more PCIE devices 203. The memory 202 stores at least one piece of program code. The at least one piece of program code is loaded and executed by the processor 201 to implement PCIE device startup methods provided in the following method embodiments. Certainly, the computer device 200 may further have components such as a wired or wireless network interface and an input/output interface, to perform input/output. The computer device 200 may further include other components configured to implement a device function. Details are not described herein.

In an example embodiment, a computer readable storage medium is further provided, such as a memory including program code. The program code may be executed by a processor in a computer device to complete a PCIE device startup method according to the following embodiment. For example, the computer readable storage medium may be a ROM, a RAM, a CD-ROM, magnetic tape, a floppy disk, an optical data storage device, or the like.

Figure 3:
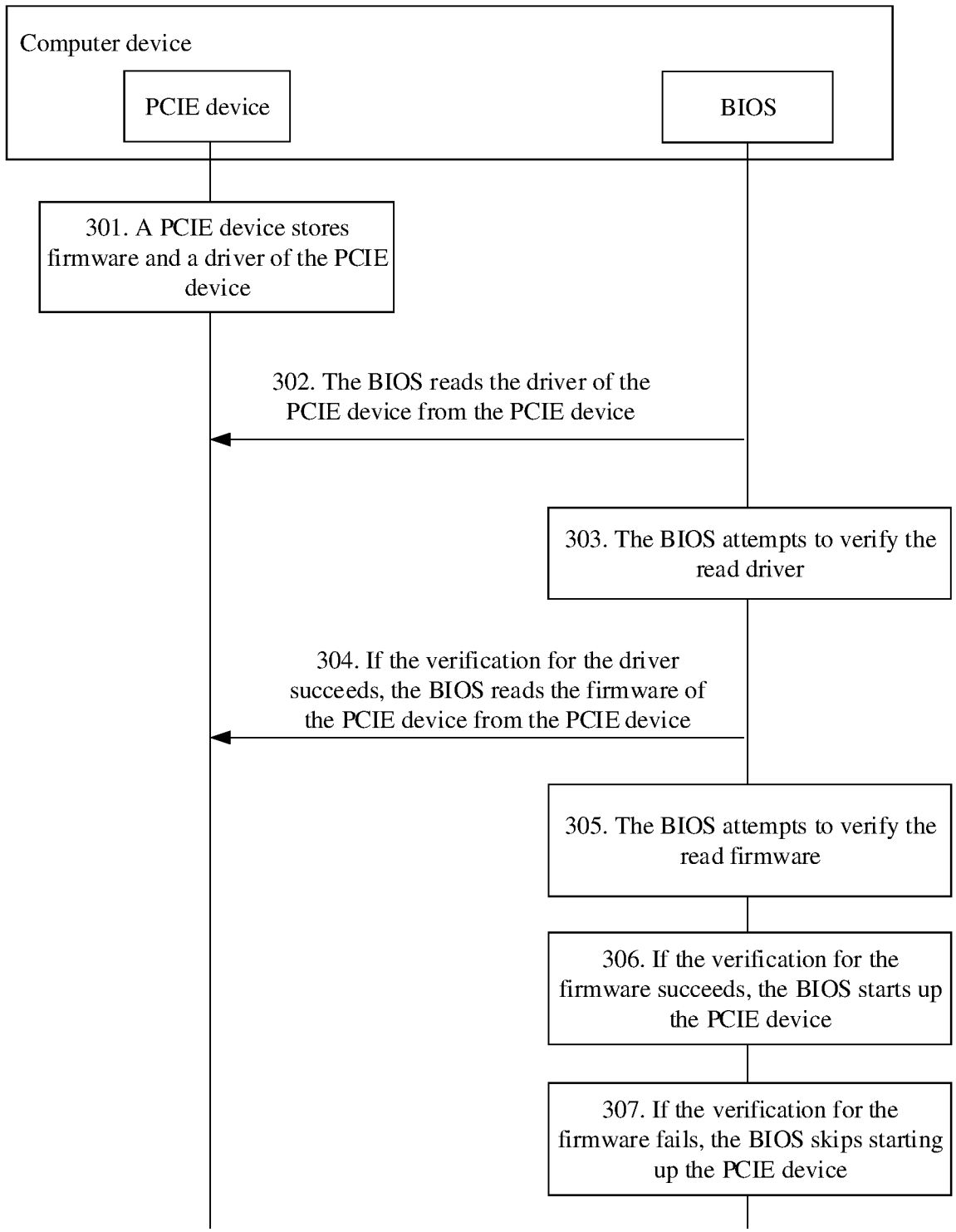
FIG. 3 is a flowchart of a PCIE device startup method according to an embodiment of the present disclosure.

To further describe a process in which the BIOS obtains the firmware of the PCIE device in the manner 1, attempts to verify the obtained firmware, and determines, based on a verification result, whether to start up the PCIE device, a flowchart of a PCIE device startup method according to an embodiment of the present disclosure is shown in FIG. 3. The method is applied to a computer device including a PCIE device.

301. The PCIE device stores firmware and a driver of the PCIE device.

The PCIE device is any PCIE device, and the firmware includes firmware code and signature data. The driver includes target driver code and target signature data. The driver code is code for implementing a driver function, and the target signature data is a digital signature of the driver code, and is used to ensure integrity of the driver code.

Figure 4:
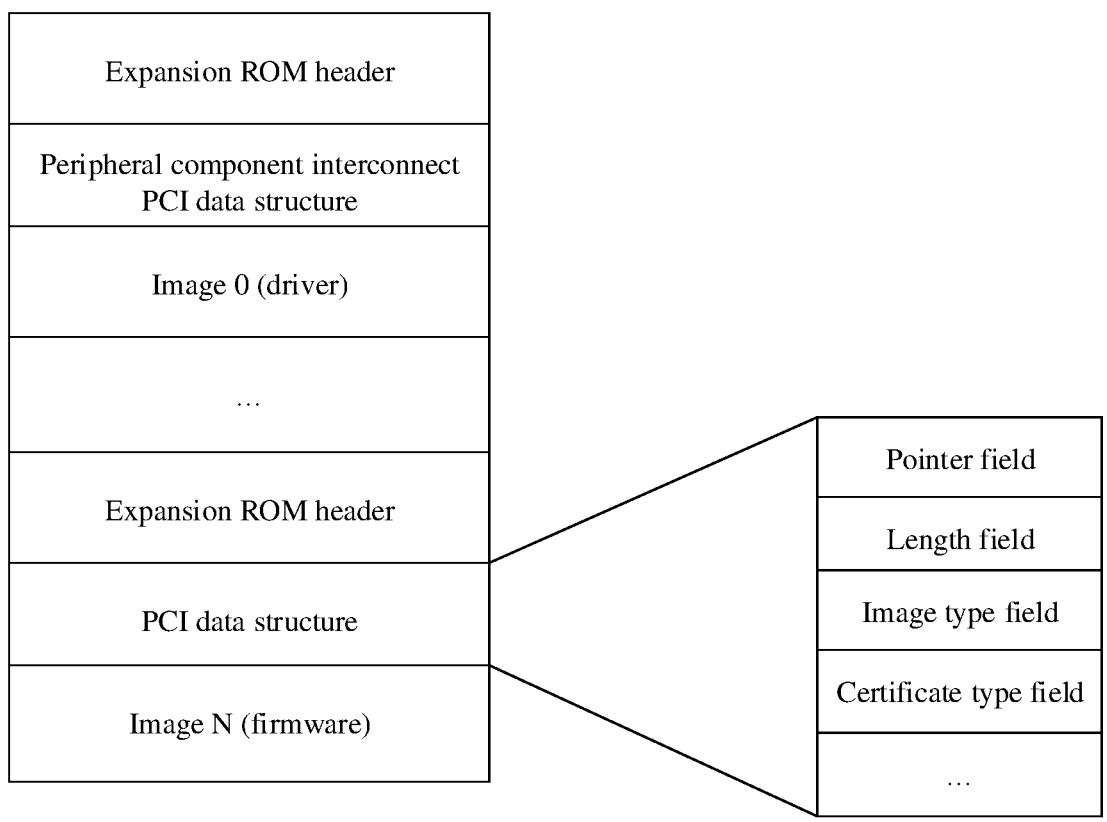
FIG. 4 is a schematic diagram of space of an expansion ROM according to an embodiment of the present disclosure.

In a possible implementation, the PCIE device obtains the firmware and driver of the PCIE device, and stores the obtained firmware and driver each as a ROM image in an expansion ROM of the PCIE device. The expansion ROM includes as many code images (that is, ROM images) as required by different systems and processor architectures. For example, FIG. 4 is a schematic diagram of space of an expansion ROM according to an embodiment of the present disclosure. The expansion ROM stores N+1 ROM images, which are respectively an image 0 to an image N. Each ROM image corresponds to one expansion ROM header and one peripheral component interconnect (PCI) data structure, where N is an integer greater than 0. The expansion ROM header and the PCI data structure are used to store information required by a corresponding ROM image. The expansion ROM header is used to store a ROM signature and a pointer pointing to the PCI data structure. The PCI data structure includes a pointer field, a length field, an image type field, a certificate type field, and another field. The pointer field is used to store a device list pointer to indicate a device supported by the expansion ROM. The length field is used to store the length of the PCI data structure and the length of a ROM image corresponding to the PCI data structure. The image type field is used to indicate a code type of the image, such as, a driver type or a firmware type. The certificate type field is used to store a type of an encryption algorithm for calculating the signature data.

Optionally, a process in which the PCIE device obtains the firmware is: the PCIE device calculates the firmware code based on a first digest calculation algorithm, to obtain first digest data of the firmware code, and encrypts the first digest data based on a private key of the PCIE device and a first encryption algorithm, to obtain signature data of the firmware code. The PCIE device combines the firmware code and the signature data into firmware. Optionally, a process in which the PCIE device obtains the driver is: the PCIE device calculates the driver code based on a second digest calculation algorithm to obtain second digest data of the driver code, and encrypts, based on the private key of the PCIE device and a second encryption algorithm, the second digest data to obtain target signature data. The PCIE device combines the driver code and the target signature data into the driver.

The first digest calculation algorithm is an algorithm that is negotiated by the PCIE device and the BIOS and used to calculate the first digest data. The second digest calculation algorithm is an algorithm that is negotiated by the PCIE device and the BIOS and used to calculate the second digest data. The first/second digest calculation algorithm includes a hash algorithm, a message digest (MD) algorithm, a secure hash algorithm (SHA), a message authentication code (MAC) algorithm, and another digest calculation algorithm. The first/second digest calculation algorithm is not specifically limited in this embodiment. The first encryption algorithm is an encryption algorithm that is negotiated by the PCIE device and the BIOS and used to encrypt the first digest data. The second encryption algorithm is an encryption algorithm that is negotiated by the PCIE device and the BIOS and used to encrypt the second digest data. The first/second encryption algorithm includes a digital signature algorithm (DSA), an elliptic curve digital signature algorithm (ECDSA), or an RSA encryption algorithm proposed by Ronald Linn Rivest (Ron Rivest), Adi Shamir, and Leonard Adleman. The first/second encryption algorithm is not specifically limited in this embodiment. An inverse algorithm of the first encryption algorithm is a first decryption algorithm. The first decryption algorithm is used to decrypt the signature data of the firmware code to obtain decrypted data that may be denoted as first decrypted data. An inverse algorithm of the second encryption algorithm is a second decryption algorithm, and is used to decrypt the target signature data of the driver code to obtain decrypted data that is denoted as second decrypted data.

Optionally, a process in which the PCIE device combines the firmware code and the signature data into firmware is: the PCIE device stores the signature data in a first target location of the firmware code to obtain the firmware. Optionally, a process in which the PCIE device combines the driver code and the target signature data into a driver is: the PCIE device stores the target signature data in a second target location of the driver code to obtain the driver. The first target location is a location that is negotiated by the PCIE device and the BIOS and is in the firmware code to store the signature data. Optionally, the first target location is any location in the firmware code, for example, a header, a certain middle location, or a tail of the firmware code. The second target location is a location that negotiated by the PCIE device and the BIOS and is in the driver code to store the target signature data. Optionally, the second target location is any location in the driver code, for example, a header, a certain middle location, or a tail of the driver code. The first/second target location is not specifically limited in this embodiment.

After obtaining the firmware, the PCIE device stores the firmware as a ROM image in the expansion ROM, and configures an expansion ROM header and a PCI data structure that correspond to the image of the firmware. The expansion ROM header is used to store a pointer of the PCI data structure. The PCI data structure includes a pointer field, a length field, an image type field, a certificate type field, and the like. The pointer field is used to indicate a device supported by the expansion ROM. The length field is used to store the length of the PCI data structure and the length of the image. The image type field is used to store an image type of the image, and the image type is used to indicate a code type of the image. The certificate type field is used to store the certificate type of the data signature of the image. The certificate type is used to indicate the encryption algorithm for calculating the signature data. For example, the image N in FIG. 4 is an image of the firmware. The PCIE device configures, in an expansion ROM header corresponding to the image N, a pointer of a PCI data structure corresponding to the image N. For the PCI data structure corresponding to the image N, the PCIE device stores the length of the PCI data structure and the length of the firmware in the length field, stores the code type of the firmware code in the image type field, and stores the type of the first encryption algorithm in the certificate type field.

After obtaining the driver, the PCIE device stores the driver as another ROM image in the expansion ROM, and configures an expansion ROM header and a PCI data structure that correspond to the image of the driver. For example, the image 0 in FIG. 4 is an image of the driver. The PCIE device configures, in an expansion ROM header corresponding to the image 0, a pointer of a PCI data structure corresponding to the image 0. For the pointer of the PCI data structure corresponding to the image 0, the PCIE device stores the length of the PCI data structure and the length of the driver in the length field, stores the code type of the driver code in the image type field, and stores the type of the second encryption algorithm in the certificate type field.

It should be noted that the image of the firmware stored in the expansion ROM may be located after the image of the driver. For example, the image of the firmware is a subsequent image of the image of the driver, or the image of the firmware is the last image stored in the expansion ROM. After the PCIE device stores all the images in the expansion ROM, the PCIE device stores a start address of the expansion ROM in an expansion ROM base address field in base address register (BAR) space of the PCIE device, so that the BIOS of the computer device can subsequently read the start address of the expansion ROM from the expansion ROM base address field.

302. The BIOS reads the driver of the PCIE device from the PCIE device.

After the computer device is powered on or reset, the BIOS starts to run. The BIOS enumerates each PCIE device installed on the computer device. After the BIOS enumerates the PCIE device, the BIOS reads the driver of the PCIE device from the PCIE device.

The BIOS may read the image of the driver in an expansion read-only memory (ROM) of the PCIE device, so that the driver of the PCIE device is read from the PCIE device. In a possible implementation, the BIOS accesses the expansion ROM base address field in the BAR space of the PCIE device through a target communication interface. The BIOS reads the start address of the expansion ROM of the PCIE device from the expansion ROM base address field, and accesses the expansion ROM based on the start address of the expansion ROM. For any image stored in the expansion ROM, the BIOS may read an image type of the image from an image type field of a PCI data structure corresponding to the image. If the read image type is a code type of the driver code, the image is an image of the driver. When the image is the image of the driver, the BIOS may further read a certificate type of the target signature data from a certificate type field of the PCI data structure corresponding to the image. Therefore, based on the second encryption algorithm indicated by the certificate type, the inverse algorithm of the second encryption algorithm is determined as a second decryption algorithm. The BIOS may further read the image of the driver of the PCIE device from the expansion ROM. If the read image type is not the code type of the driver code, the BIOS reads an image type of a next image of the image until the image of the driver is obtained. Still based on FIG. 4, the BIOS reads the image 0 (that is, the driver) from the expansion ROM.

303. The BIOS attempts to verify the read driver.

The BIOS attempts to verify the driver based on the stored public key of the PCIE device.

In a possible implementation, the BIOS obtains the target signature data of the driver code from the second target location of the driver code of the driver, and decrypts the target signature data based on the public key of the PCIE device and the second decryption algorithm, to obtain the second decrypted data. The BIOS calculates the driver code based on the second digest calculation algorithm to obtain the second digest data of the driver code. If the obtained second digest data is the same as the second decrypted data, it indicates that the driver code in the driver is not tampered with and that the driver code is integral, the verification for the driver succeeds. If the obtained second digest data is different from the second decrypted data, it indicates that the driver code has been tampered with and that the driver code is not integral, the verification for the driver fails.

304. If the verification for the driver succeeds, the BIOS reads the firmware of the PCIE device from the PCIE device.

The BIOS may read the image of the firmware from the expansion read-only memory (ROM) of the PCIE device, so that the firmware is read from the PCIE device. In a possible implementation, the BIOS accesses the expansion ROM based on the start address of the expansion ROM through the target communication interface. For any image stored in the expansion ROM, the BIOS may read an image type of the image from the image type field of a PCI data structure corresponding to the image. If the read image type is a code type of the firmware code, the image is an image of the firmware. When the image is the image of the firmware, the BIOS may further read a certificate type of the signature data of the firmware code from the certificate type field of the PCI data structure corresponding to the image (that is, a process in which the BIOS reads, from the expansion ROM, the image type of the image of the firmware and the certificate type of the signature data), so that the BIOS may further determine, based on the first encryption algorithm indicated by the certificate type, that the inverse algorithm of the first encryption algorithm is the first decryption algorithm, and the BIOS reads the image of the firmware from the expansion ROM. If the read image type is not the code type of the firmware code, the BIOS reads an image type of the next image of the image until the image of the firmware is obtained. In this case, the image of the firmware read by the BIOS includes the firmware code and the signature data of the firmware code. Still based on FIG. 4, the BIOS reads the image N (that is, the firmware) from the expansion ROM.

In a possible implementation, if the verification for the driver fails, the driver may bring a security risk to the computer device, and the BIOS jumps to perform step 307, that is, the BIOS skips starting up the PCIE device.

305. The BIOS attempts to verify the read firmware.

The BIOS attempts to verify the firmware based on the stored public key of the PCIE device.

In a possible implementation, the BIOS obtains the signature data of the firmware code from the first target location of the firmware code in the firmware, and decrypts the signature data based on the public key of the PCIE device and the first decryption algorithm, to obtain the first decrypted data. The BIOS calculates the firmware code based on the first digest calculation algorithm, to obtain the first digest data of the firmware code. If the obtained first digest data is the same as the first decrypted data, it indicates that the firmware code is not tampered with and that the firmware code is integral, the verification for the firmware succeeds. If the obtained first digest data is different from the first decrypted data, it indicates that the firmware code has been tampered with and that the firmware code is not integral, the verification for the firmware fails.

306. If the verification for the firmware succeeds, the BIOS starts up the PCIE device.

If the verification for the firmware succeeds, the firmware does not bring a security risk to the computer device, and the BIOS starts up the PCIE device.

In a possible implementation, a process in which the BIOS starts up the PCIE device is: the BIOS configures the PCIE device, for example, the BIOS allocates a PCI resource to the PCIE device, so that the PCIE device is visible to an operating system (OS) in the computer device. The PCI resource includes a bus device function (BDF) and memory space.

It should be noted that the PCIE device has been powered on before the BISO starts up the PCIE device. Therefore, the PCIE device may interact with the BIOS. Therefore, starting up the PCIE device in this embodiment does not mean that the PCIE device is powered on and/or the PCIE device interacts with the processing chip, but means that the PCIE device is normally configured, so that the normally configured PCIE device may work completely normally.

307. If the verification for the firmware fails, the BIOS skips starting up the PCIE device.

If the verification for the firmware fails, after the PCIE device is started up, the firmware may bring a security risk to the computer device, and the BIOS thus skips starting up the PCIE device.

The BIOS may skip starting up the PCIE device by blocking the PCIE device, so that the operating system in the computer device is invisible to the PCIE device that is not started up. In a possible implementation, a process in which the BIOS blocks the PCIE device is: the BIOS controls the PCIE device to be in the reset state or power-off state; or the BIOS marks the PCIE device as a startup disabled state, where the startup disabled state is used to indicate to skip starting up the PCIE device, so that a PCIE device with a security risk is completely blocked. Optionally, the BIOS controls a hardware circuit in the computer device to output a PCIE reset signal, so that the PCIE device is in the reset state. Optionally, when the computer device supports hot swap of the PCIE device, a power supply circuit of the PCIE device is controlled by a target controller, and the BIOS sends to the target controller a power-off instruction for powering off the PCIE device. After the target controller receives the power-off instruction, the target controller controls the power supply circuit of the PCIE device, so that the PCIE device is powered off. Optionally, the BIOS may store a target identifier of the PCIE device and a state identifier of the startup disabled state in an associated manner, so that the PCIE device is marked as the startup disabled state.

Figure 5:
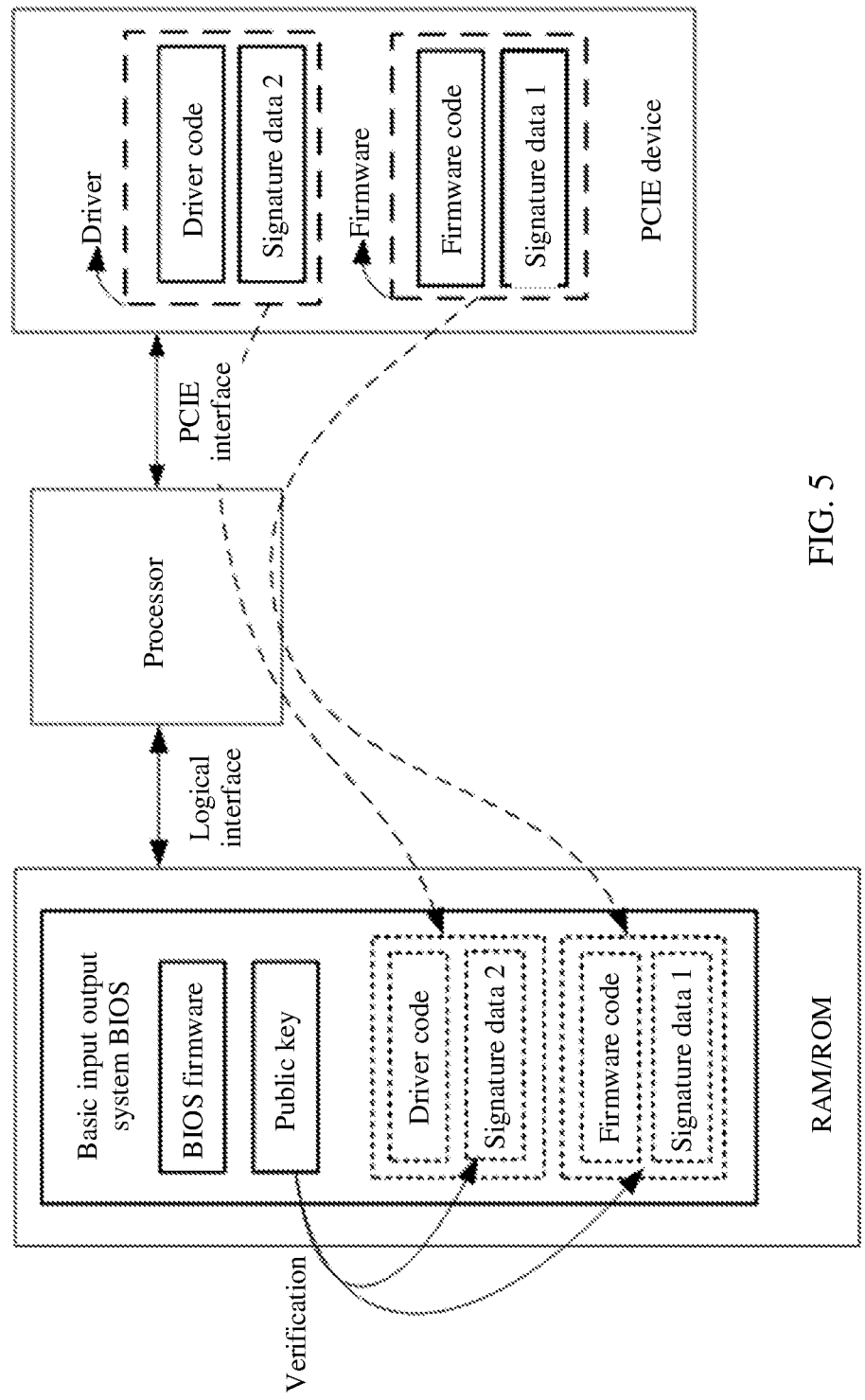
FIG. 5 is a schematic diagram of startup of a PCIE device according to an embodiment of the present disclosure.

To further describe the process shown in steps 302 to 307, refer to a schematic diagram of startup of a PCIE device according to an embodiment of the present disclosure as shown in FIG. 5. In FIG. 5, signature data of firmware code is signature data 1, and target signature data of driver code is signature data 2. A BIOS reads, from a PCIE device, a driver including the driver code and the signature data 2. The BIOS attempts to verify, based on a stored public key of the PCIE device and the signature data 2 in the driver, whether the driver code is integral. If the driver code is integral, the BIOS continues to read, from the PCIE device, firmware including the firmware code and the signature data 1. The BIOS attempts to verify, based on the stored public key of the PCIE device and the signature data 1 in the firmware, whether the firmware code is integral. If the firmware code is integral, the PCIE device is started up; otherwise, the PCIE device is not started up.

According to the method provided in this embodiment, the BIOS attempts to verify the firmware of the PCIE device, to determine whether the firmware of the PCIE device is tampered with, and the BIOS may start up only a PCIE device where the firmware that succeeds in the verification is located. In this way, the computer device is prevented from starting up a PCIE device of which the firmware is tampered with, and a security risk caused by the PCIE device to the computer device is reduced. In addition, the BIOS attempts to verify the PICE device, and further attempts to verify the driver of the PCIE device. As long as either of the firmware and the driver fails to be verified, the BIOS skips starting up the PCIE device. In this way, the computer device is prevented from starting up a PCIE device of which the firmware is tampered with, and a security risk caused by the PCIE device to the computer device is further reduced. In addition, the BIOS controls the PCIE device where the firmware that fails in the verification is located to be in a reset state or a power-off state, or marks the PCIE device where the firmware that fails in the verification is located as a startup disabled state. In this way, the PCIE device with a security risk is completely blocked.

Figure 6:
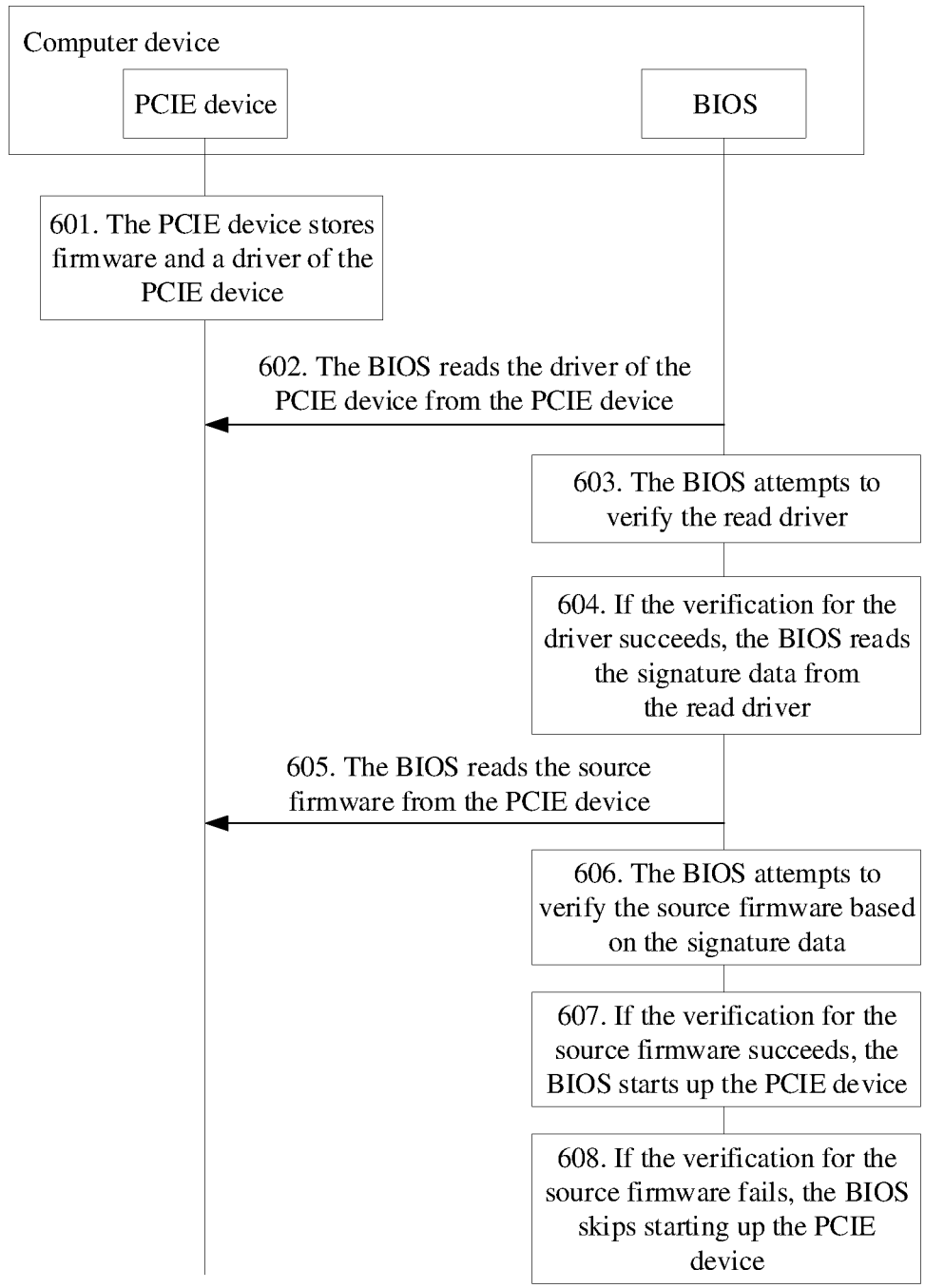
FIG. 6 is a flowchart of another PCIE device startup method according to an embodiment of the present disclosure.

To further describe a process in which a BIOS obtains the firmware of the PCIE device in the manner 2, attempts to verify the obtained firmware, and determines, based on a verification result, whether to start up the PCIE device, refer to a flowchart of another PCIE device startup method according to an embodiment of the present disclosure as shown in FIG. 6.

The method is applied to a computer device including a PCIE device.

601. A PCIE device stores firmware and a driver of the PCIE device.

In the embodiment shown in FIG. 6, the firmware is actually firmware code, and the driver includes driver code, target signature data of the driver code, and signature data of the firmware code. For example, in another schematic diagram of startup of a PCIE device according to an embodiment of the present disclosure shown in FIG. 7, firmware is firmware code, target signature data included in a driver is signature data 2, and signature data of the firmware code is signature data 1.

In a possible implementation, the PCIE device obtains the firmware and driver of the PCIE device, and stores the obtained firmware and driver each in an expansion ROM of the PCIE device as a ROM image.

Optionally, a process in which the PCIE device obtains the firmware and driver of the PCIE device is: the PCIE device obtains the firmware code and the driver code, and obtains the signature data of the firmware code and the target signature data of the driver code. The PCIE device stores the signature data of the firmware code in a third target location of the driver code, and stores the target signature data in a second target location of the driver code, to obtain the driver. The third target location is a location that is negotiated by the PCIE device and the BIOS and is in the driver code to store the signature data of the firmware code. Optionally, the third target location is any location except the second target location in the driver code. The third target location is not specifically limited in this embodiment.

It should be noted that related descriptions are made in step 301 for a process in which the PCIE device obtains the signature data of the firmware code and the target signature data of the driver code. Herein, a process in which the PCIE device obtains the signature data of the firmware code and the target signature data of the driver code is not described in detail again in this embodiment. For a process in which the PCIE device stores the obtained firmware and driver each in the expansion ROM of the PCIE device as a ROM image, related descriptions are made in step 301. Herein, the process in which the PCIE device stores the obtained firmware and driver each in the expansion ROM of the PCIE device as a ROM image is not described in detail again in this embodiment.

It should be noted that in this case, the firmware includes only the firmware code, and signature data of the firmware code is stored in the driver. In this case, a certificate type of the signature data of the firmware code may be stored in a certificate type field in a PCI data structure corresponding to an image of the firmware or a certificate type field in a PCI data structure corresponding to an image of the driver.

602. The BIOS reads a driver of the PCIE device from the PCIE device, where the driver includes the signature data.

The process shown in step 602 is similar to that shown in step 302. The process shown in step 602 is not described in detail herein again in this embodiment.

603. The BIOS attempts to verify the read driver.

The process shown in step 603 is similar to that shown in step 303. The process shown in step 603 is not described in detail herein again in this embodiment.

Figure 7:
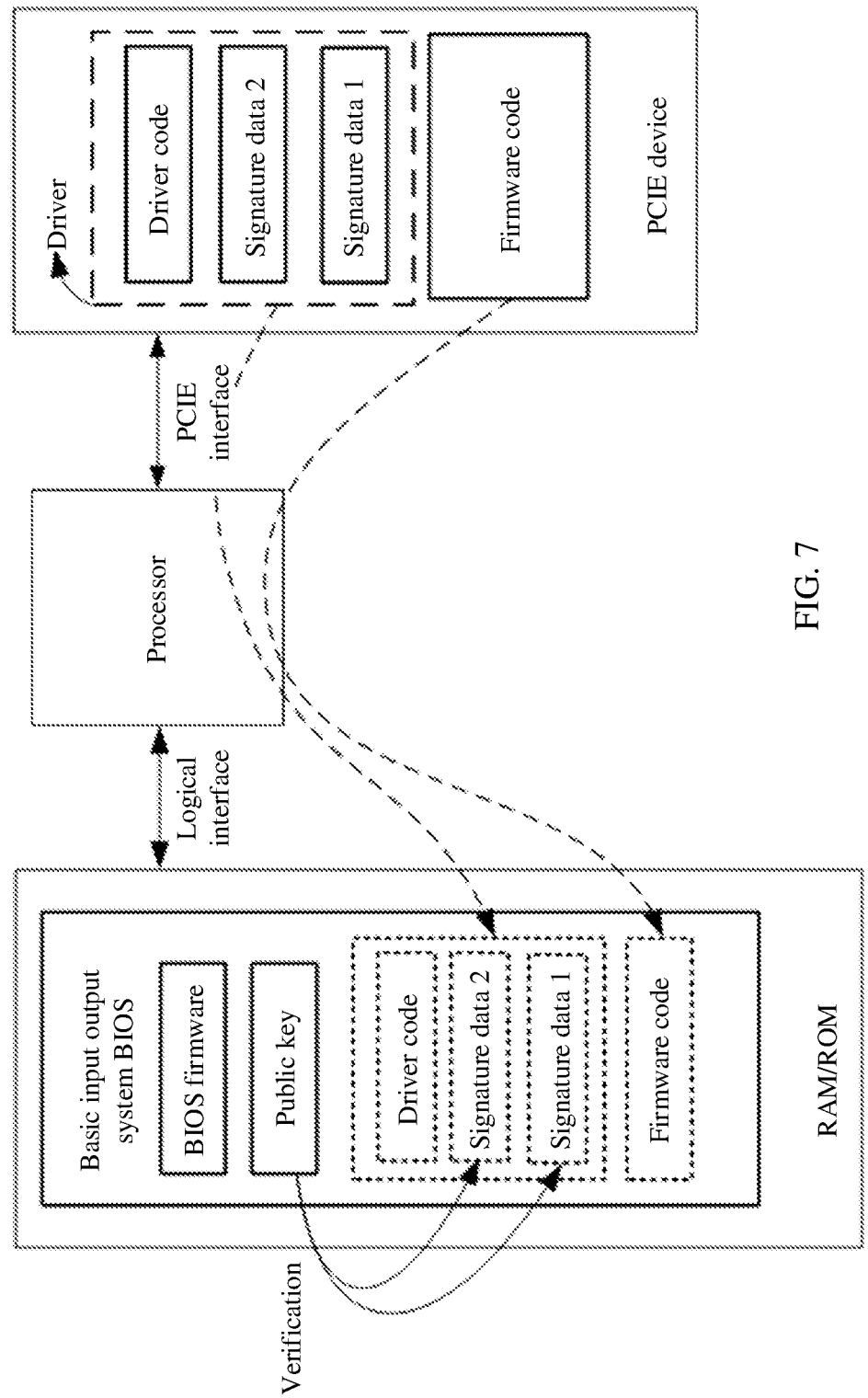
FIG. 7 is another schematic diagram of startup of a PCIE device according to an embodiment of the present disclosure.

Still based on FIG. 7, the BIOS decrypts the signature data 2 based on the public key of the PCIE device and the second decryption algorithm, to obtain second decrypted data. The BIOS calculates the driver code based on a second digest calculation algorithm, to obtain second digest data of the driver code. If the obtained second digest data is the same as the second decrypted data, the verification for the driver succeeds; otherwise, the verification for the driver fails.

604. If the verification for the driver succeeds, the BIOS obtains the signature data from the read driver.

The BIOS may obtain the signature data of the firmware code from the image of the driver. In a possible implementation, the BIOS obtains the signature data from the third target location of the driver code in the image of the driver.

It should be noted that the processes shown in steps 602 and 604 are a process in which the BIOS obtains the signature data of the firmware code from the driver of the PCIE device.

605. The BIOS reads the firmware code from the PCIE device.

The BIOS may read the image of the firmware code from the expansion ROM of the PCIE device, so that the firmware code is read from the PCIE device. A process in which the BIOS reads the image of the firmware code from the expansion ROM of the PCIE device is similar to the process in which the BIOS reads the image of the firmware of the PCIE device in step 304. Herein, the process in which the BIOS reads the image of the firmware code from the expansion ROM of the PCIE device is not described in detail again in this embodiment.

After the BIOS reads the firmware code, the BIOS determines the signature data and the firmware code as the firmware. It should be noted that the processes shown in the foregoing steps 602, 604, and 605 are a process in which the input/output system (BIOS) of the computer device obtains the firmware of the PCIE device.

606. The BIOS attempts to verify the firmware code based on the signature data.

The BIOS decrypts the signature data based on the public key of the PCIE device and the first decryption algorithm, to obtain first decrypted data. The BIOS calculates the firmware code based on a first digest calculation algorithm, to obtain first digest data of the firmware code. If the obtained first digest data is the same as the first decrypted data, it indicates that the firmware code is not tampered with and that the firmware code is integral, the verification for the firmware succeeds. If the obtained first digest data is different from the first decrypted data, it indicates that the firmware code has been tampered with and that the firmware code is not integral, the verification for the firmware fails.

Still based on FIG. 7, the BIOS decrypts the signature data 1 based on the public key of the PCIE device and the first decryption algorithm, to obtain the first decrypted data. The BIOS calculates the firmware code based on the first digest calculation algorithm, to obtain the first digest data of the firmware code. If the obtained first digest data is the same as the first decrypted data, the verification for the firmware code succeeds; otherwise, the verification for the firmware code fails.

607. If the verification for the firmware code succeeds, the BIOS starts up the PCIE device.

The process shown in step 607 is similar to the process shown in step 306. Herein, the process shown in step 607 is not described in detail again in this embodiment.

608. If the verification for the firmware code fails, the BIOS skips starting up the PCIE device.

The process shown in step 608 is similar to the process shown in step 307. Herein, the process shown in step 608 is not described in detail again in this embodiment.

According to the method provided in this embodiment, the BIOS attempts to verify the firmware of the PCIE device, to determine whether the firmware of the PCIE device is tampered with, and the BIOS may start up only a PCIE device where the firmware that succeeds in the verification is located. In this way, the computer device is prevented from starting up a PCIE device of which the firmware is tampered with, and a security risk caused by the PCIE device to the computer device is reduced. In addition, the BIOS attempts to verify the PICE device, and further attempts to verify the driver of the PCIE device. As long as either of the firmware and the driver fails to be verified, the BIOS skips starting up the PCIE device. In this way, the computer device is prevented from starting up a PCIE device of which the firmware is tampered with, and a security risk caused by the PCIE device to the computer device is further reduced. In addition, the BIOS controls the PCIE device where the firmware that fails in the verification is located to be in a reset state or a power-off state, or marks the PCIE device where the firmware that fails in the verification is located as a startup disabled state. In this way, the PCIE device with a security risk is completely blocked.

Figure 8:
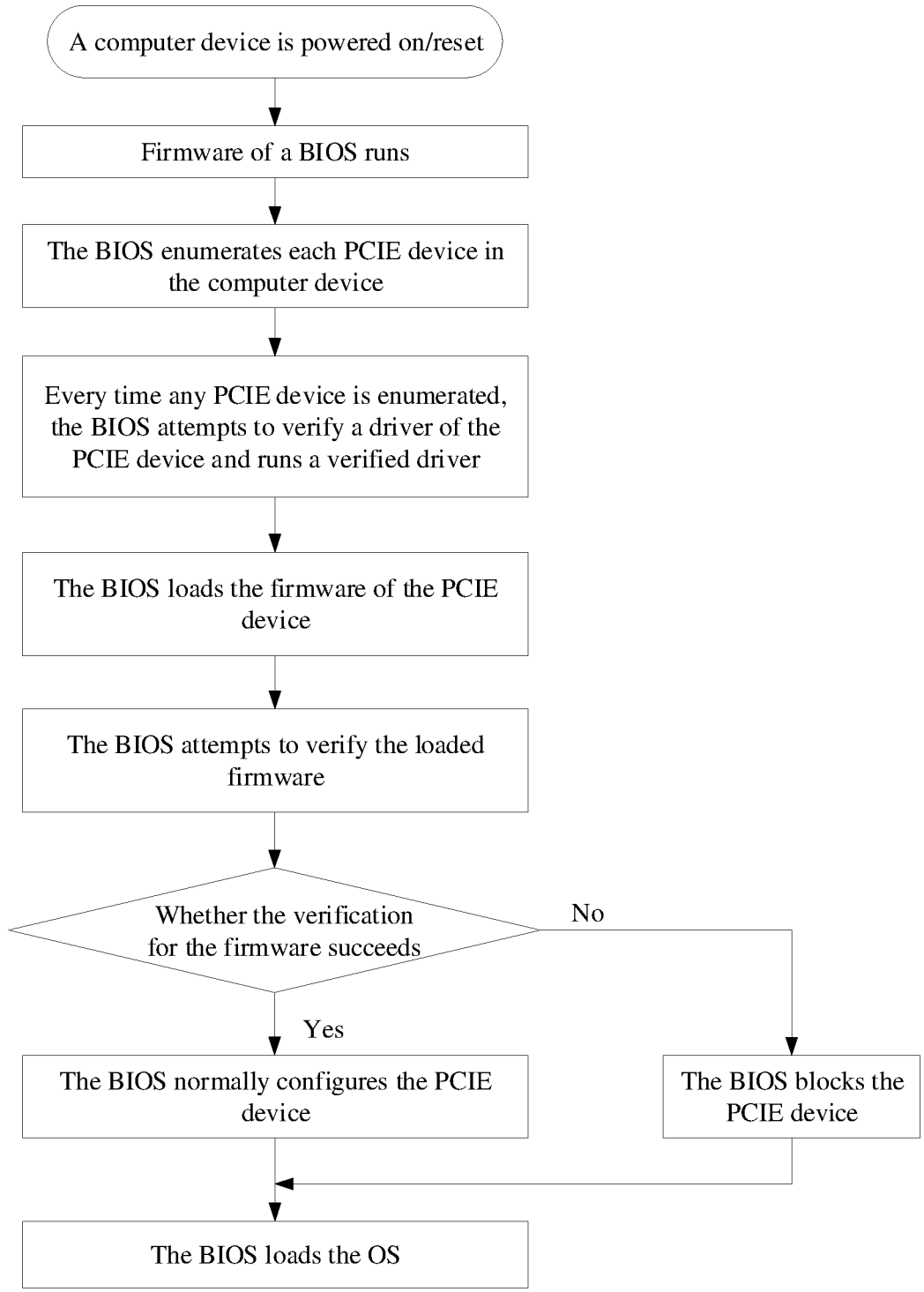
FIG. 8 is a flowchart of a PCIE device startup method according to an embodiment of the present disclosure.

To further comprehensively describe the processes shown in FIG. 3 and FIG. 6, refer to a flowchart of a PCIE device startup method according to an embodiment of the present disclosure as shown in FIG. 8. A computer device is powered on or reset. Firmware of a BIOS of the computer device runs. The BIOS enumerates each PCIE device in the computer device. Every time any PCIE device is enumerated, the BIOS attempts to verify a driver of the PCIE device and runs a verified driver. The BIOS loads the firmware of the PCIE device. The BIOS performs verification on the loaded firmware. If the verification succeeds, the BIOS normally configures the PCIE device, so that the PCIE device is visible to an OS of the computer device; otherwise, the BIOS blocks the PCIE device. When the BIOS has loaded all verified PCIE devices in the computer device, the BIOS loads the OS.

It should be noted that "tampered with" mentioned in the present disclosure includes a plurality of cases such as malicious tampering, unintentional modification, non-integrity of firmware, firmware damage, an increase/decrease in a code amount of firmware code, or modification of content of firmware code. When the first digest data calculated by the BISO based on the obtained firmware code is different from the first decrypted data calculated by the BIOS based on the obtained signature data, it indicates that the firmware obtained by the BIOS has been tampered with.

Figure 9:
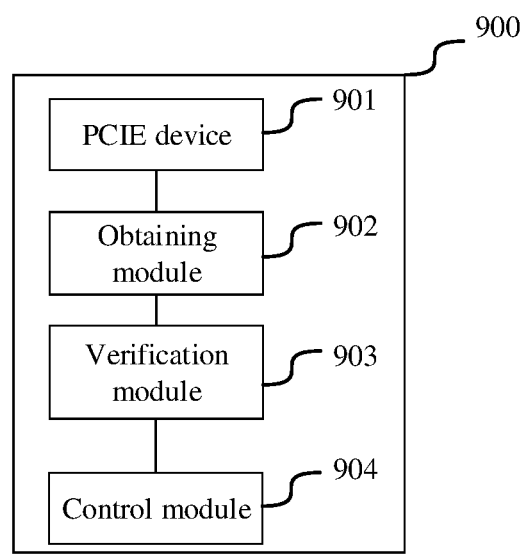
FIG. 9 is a schematic diagram of a structure of a PCIE device startup apparatus according to an embodiment of the present disclosure.

FIG. 9 is a schematic diagram of a structure of a PCIE device startup apparatus according to an embodiment of the present disclosure. The apparatus 900 includes a PCIE device 901. The apparatus 900 includes:

An obtaining module 902, configured to be used by an input/output system (BIOS) to obtain firmware of the PCIE device;
   a verification module 903, configured to be used by the BIOS to attempt to verify the firmware; and
   a control module 904, configured to be used by the BIOS to start up the PCIE device if the verification for the firmware succeeds.

Optionally, the control module 904 is further configured to:
   skip, by the BIOS, starting up the PCIE device if the verification for firmware fails.

Optionally, the control module 904 is further configured to:
   control, by the BIOS, the PCIE device to be in a reset state or a power-off state; or
   mark, by the BIOS, the PCIE device as a startup disabled state, where the startup disabled state is used to indicate to skip starting up the PCIE device.

Optionally, the obtaining module 902 is configured to:
   read, by the BIOS, an image of the firmware from an expansion read-only memory (ROM) of the PCIE device.

Optionally, the firmware includes signature data. The obtaining module is further configured to:
   read, by the BIOS, an image type of the image and a certificate type of the signature data from the expansion ROM, where the image type is used to indicate a code type of the image, and the certificate type is used to indicate an encryption algorithm for calculating the signature data.

Optionally, the firmware includes firmware code and signature data of the firmware code. The obtaining module includes:
   an obtaining unit, configured to be used by the BIOS to obtain the signature data of the firmware code from a driver of the PCIE device; and
   a reading unit, configured to be used by the BIOS to read the firmware code from the PCIE device.

Optionally, the reading unit is configured to:
   read, by the BIOS, an image of the firmware code from an expansion ROM of the PCIE device.

Optionally, the reading unit is further configured to:
   read, by the BIOS, an image type of the image and a certificate type of the signature data from the expansion ROM, where the image type is used to indicate a code type of the image, and the certificate type is used to indicate an encryption algorithm for calculating the signature data.

Optionally, the obtaining unit is configured to:
   read, by the BIOS, an image of the driver from an expansion ROM of the PCIE device; and
   obtain, by the BIOS, the signature data of the firmware code from the image of the driver.

Optionally, the verification module 903 is further configured to:
   attempt, by the BIOS, to verify the driver; and perform, by the BIOS, the step of reading the firmware code from the PCIE device if the verification for the driver succeeds.

Optionally, the BIOS stores the public key of the PCIE device, and the public key is used to attempt to verify the firmware.

Optionally, the apparatus 900 further includes:

a modification module, configured to be used by the BIOS to modify the stored public key of the PCIE device based on a public key modification instruction.

All of the foregoing technical solutions may form optional embodiments of this disclosure through any combination. Details are not described herein again.

It should be noted that, when the PCIE device startup apparatus provided in the foregoing embodiment starts up a PCIE device, division of the foregoing functional modules is merely used as an example for description. In an actual application, the foregoing functions may be allocated to different functional modules for implementation according to a requirement, that is, an internal structure of the apparatus is divided into different functional modules, so that all or some of the functions described above is implemented. In addition, the embodiments of the PCIE device startup method provided in the foregoing embodiments pertain to a same concept. For a specific implementation process, refer to the method embodiments, and details are not described herein again.

Embodiments of the present disclosure further provide a computer program product or a computer program. The computer program product or the computer program includes computer instructions. The computer instructions are stored in a computer readable storage medium. A processor of a computer device reads the computer instruction from the computer readable storage medium, and the processor executes the computer instruction, so that the computer device performs the foregoing PCIE device startup method.

A person of ordinary skill in the art may understand that all or some of the steps of the foregoing embodiments may be implemented by hardware or a program instructing related hardware. The program may be stored in a computer readable storage medium. The storage medium may be a read-only memory, a magnetic disk, a compact disc, or the like.

The foregoing description is merely optional embodiments of the present disclosure, but is not intended to limit the present disclosure. Any modification, equivalent replacement, or improvement made without departing from the spirit and principle of the present disclosure should fall within the protection scope of the present disclosure.

What is claimed is:

1. A peripheral component interconnect express (PCIE) device startup method, applied to a computer device comprising a PCIE device, wherein the method comprises:
    obtaining, by a basic input/output system (BIOS) of the computer device, firmware of the PCIE device;
    verifying, by the BIOS, the firmware to generate a verification result; and
    starting up, by the BIOS based on the verification result, the PCIE device when the verification result indicates that the verification for the firmware succeeds,
    wherein the firmware comprises firmware code and signature data of the firmware code; and
    the obtaining by a basic input/output system (BIOS) of the computer device, firmware of the PCIE device comprises:
        obtaining, by the BIOS, the signature data of the firmware code from a driver of the PCIE device; and
        reading, by the BIOS, the firmware code from the PCIE device.

2. The method according to claim 1, further comprising:
    skipping, by the BIOS, starting up the PCIE device when the verification result indicates that the verification for the firmware fails.

3. The method according to claim 2, wherein the skipping, by the BIOS, starting up the PCIE device comprises:
    controlling, by the BIOS, the PCIE device to be in a reset state or a power-off state; or
    marking, by the BIOS, the PCIE device as a startup disabled state, wherein the startup disabled state indicates to skip starting up the PCIE device.

4. The method according to claim 1, wherein the obtaining, by a basic input/output system (BIOS) of the computer device, firmware of the PCIE device comprises:
    reading, by the BIOS, an image of the firmware from an expansion read-only memory (ROM) of the PCIE device.

5. The method according to claim 4, wherein, before the reading, by the BIOS, an image of the firmware from an expansion read-only memory (ROM) of the PCIE device, the method further comprises:
    reading, by the BIOS, an image type of the image and a certificate type of the signature data from the expansion ROM, wherein the image type indicates a code type of the image, and the certificate type indicates an encryption algorithm for calculating the signature data.

6. The method according to claim 1, wherein the reading, by the BIOS, the firmware code from the PCIE device comprises:
    reading, by the BIOS, an image of the firmware code from an expansion ROM of the PCIE device.

7. The method according to claim 6, wherein before the reading, by the BIOS, an image of the firmware code from an expansion ROM of the PCIE device, the method further comprises:
    reading, by the BIOS, an image type of the image and a certificate type of the signature data from the expansion ROM, wherein the image type indicates a code type of the image, and the certificate type indicates an encryption algorithm for calculating the signature data.

8. The method according to claim 7, wherein the obtaining, by the BIOS, the signature data of the firmware code from a driver of the PCIE device comprises:
    reading, by the BIOS, an image of the driver from the expansion ROM of the PCIE device; and
    obtaining, by the BIOS, signature data of the firmware code from the image of the driver.

9. The method according to claim 1, further comprising:
    attempting, by the BIOS, to verify the driver; and
    when the verification for the driver succeeds, performing, by the BIOS, the reading of the firmware code from the PCIE device.

10. The method according to claim 1, wherein the BIOS stores a public key of the PCIE device, and the public key is for attempting to verify the firmware.

11. The method according to claim 10, further comprising:
    modifying, by the BIOS, the stored public key of the PCIE device based on a public key modification instruction.

12. A computer device, comprising a basic input/output system (BIOS) and a peripheral component interconnect express (PCIE) device, wherein the BIOS is configured to:
    obtain firmware of the PCIE device;

verify the firmware to generate a verification result; and
start up, based on the verification result, the PCIE device when the verification result indicates that the verification for the firmware succeeds,
wherein the firmware comprises firmware code and the BIOS is further configured to:
obtain signature data of the firmware code from a driver of the PCIE devices; and
read the firmware code from the PCIE device.

13. The computer device of claim 12, wherein the BIOS is further configured to:
skip starting up the PCIE device when the verification result indicates that the verification for the firmware fails.

14. The computer device of claim 13, wherein the BIOS is further configured to:
control the PCIE device to be in a reset state or a power-off state; or
mark the PCIE device as a startup disabled state, wherein the startup disabled state indicates to skip starting up the PCIE device.

15. The computer device of claim 12, wherein the BIOS is further configured to:
read an image of the firmware from an expansion read-only memory (ROM) of the PCIE device.

16. The computer device of claim 15, wherein the firmware comprises the signature data and the BIOS is further configured to:
read an image type of the image and a certificate type of the signature data from the expansion ROM, wherein the image type indicates a code type of the image, and the certificate type indicates an encryption algorithm for calculating the signature data.

17. The computer device of claim 12, wherein the BIOS is further configured to:
read an image of the firmware code from an expansion ROM of the PCIE device.

18. A non-transitory computer readable storage medium, storing at least one computer program that, when executed by a basic input/output system (BIOS), causes the BIOS to perform a peripheral component interconnect express (PCIE) device startup method comprising:
obtaining firmware of the PCIE device;
verifying the firmware to generate a verification result; and
starting up, based on the verification result, the PCIE device when the verification result indicates that the verification for the firmware succeeds,
wherein the firmware comprises firmware code and signature data of the firmware code; and
the obtaining firmware of the PCIE device comprises:
obtaining the signature data of the firmware code from a driver of the PCIE device; and
reading the firmware code from the PCIE device.

* * * * *

UNITED STATES PATENT AND TRADEMARK OFFICE
CERTIFICATE OF CORRECTION

PATENT NO. : 12,182,580 B2
APPLICATION NO. : 18/170574
DATED : December 31, 2024
INVENTOR(S) : Yutao Li Page 1 of 1

It is certified that error appears in the above-identified patent and that said Letters Patent is hereby corrected as shown below:

In the Claims

Column 17, Claim 12, Line 8, change "of the PCIE devices." to --of the PCIE device.--.

Signed and Sealed this
Third Day of June, 2025

Coke Morgan Stewart
*Acting Director of the United States Patent and Trademark Office*